Jan. 28, 1930.  J. B. NAINTEAU  1,745,112
SPINDLE BEARING
Filed May 3, 1926    2 Sheets-Sheet 1
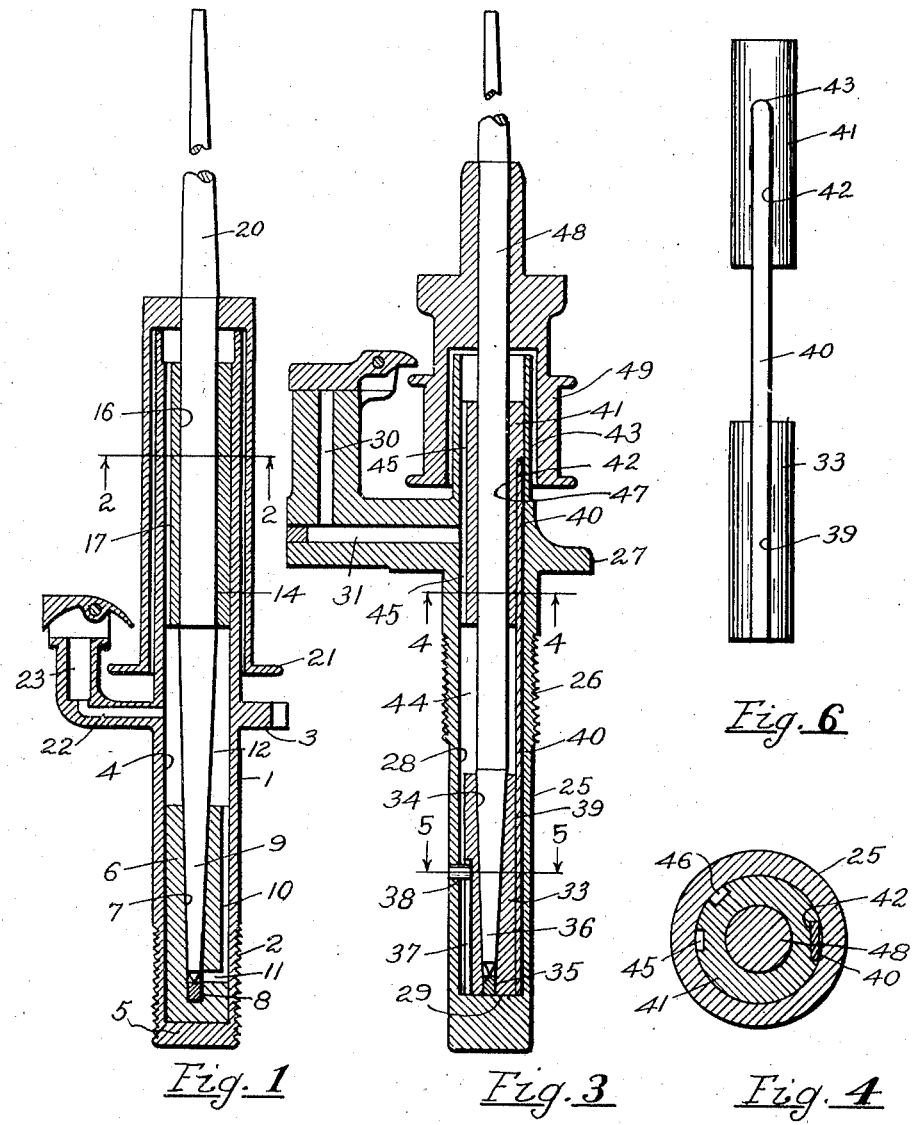
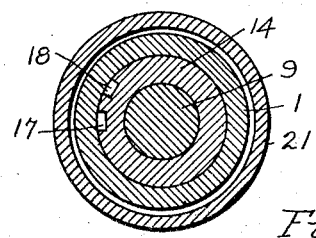
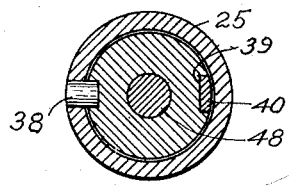
INVENTOR
JOHN B. NAINTEAU
BY Perley N. Plant
ATTORNEY Jan. 28, 1930. J. B. NAINTEAU 1,745,112
SPINDLE BEARING
Filed May 3, 1926 2 Sheets-Sheet 2
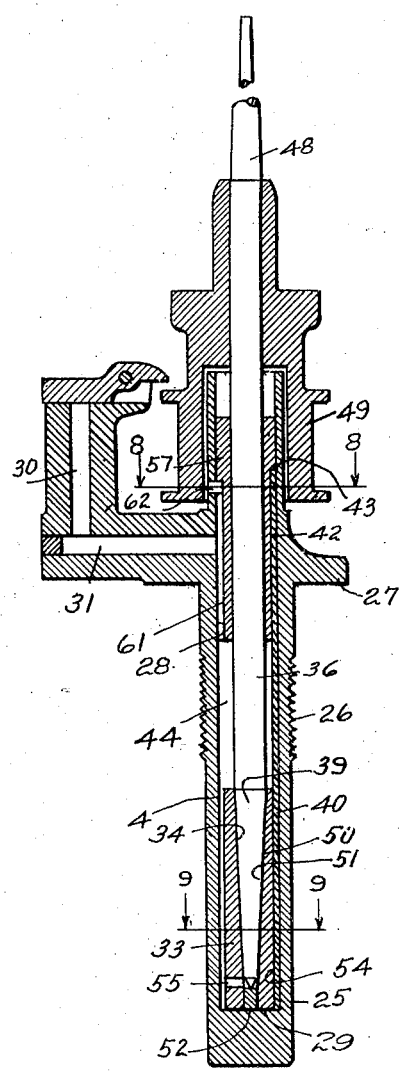
Fig. 7
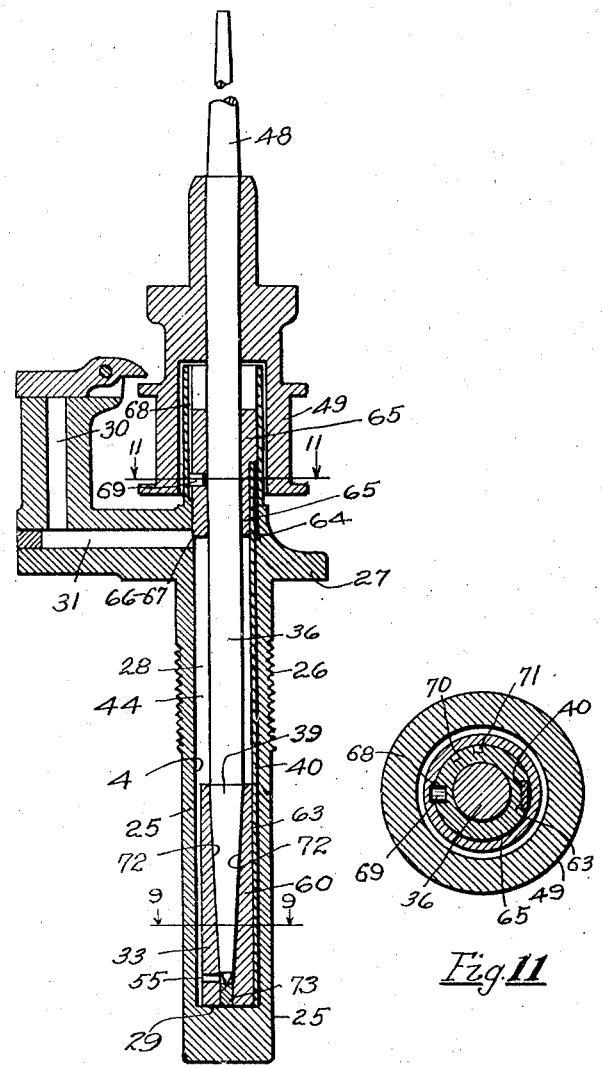
Fig. 10
Fig. 11
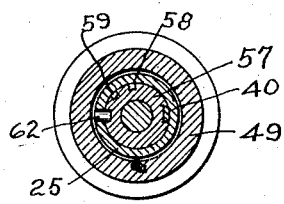
Fig. 8
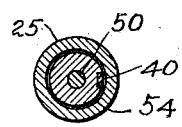
Fig. 9
INVENTOR
JOHN B NAINTEAU
BY
ATTORNEY Patented Jan. 28, 1930

1,745,112

UNITED STATES PATENT OFFICE

JOHN B. NAINTEAU, OF BRIDGETON, RHODE ISLAND, ASSIGNOR, BY MESNE ASSIGNMENTS, TO JOHN MONTGOMERY, OF WOONSOCKET, RHODE ISLAND

SPINDLE BEARING

Application filed May 3, 1926. Serial No. 106,234.

This invention relates to an improved spindle bearing adapted for use in connection with spindles generally and has for its purpose the provision of a spindle bearing which may be provided with an adequate supply of oil for lubricating the bearing for a much longer period without replenishing the supply than any bearing now in use, as well as the provision of a bearing of this character which will retain the oil and prevent the discharge of the oil from the case during the rotation of the spindle.

Another object of the invention is the provision of a device of this character wherein a novel means is provided for permitting the oil to flow downwardly freely from above the upper bolster member into the oil reservoir and thus prevent an accumulation of oil above the bolster with the consequent discharge of the same from the bearing.

A further object of the invention is to provide a self-centering bearing wherein the lower end of the spindle may move slightly in a radial direction to maintain the spindle in proper operative position at all times.

Other objects and advantages of the invention relate to improved details of construction and novel arrangements of the parts as will be more fully pointed out in the detailed description to follow.

Referring to the drawings:

Fig. 1 is a vertical sectional view of a spindle case illustrating one form of my invention, and that more particularly as applied to a silk spindle.

Fig. 2 is a horizontal sectional view, taken along the line 2—2 of Fig. 1.

Fig. 3 is a vertical sectional view of a spindle case illustrating another form of my invention, more particularly as applied to a cotton or worsted spindle.

Fig. 4 is a horizontal sectional view, taken along the line 4—4 of Fig. 3.

Fig. 5 is a horizontal sectional view taken along the line 5—5 of Fig. 3.

Fig. 6 is a perspective view of the upper and lower bolster elements and the spacing spline connecting these elements.

Fig. 7 is a vertical sectional view of another form of spindle case showing my improved bearing as applied thereto.

Fig. 8 is a horizontal sectional view, taken along the line 8—8 of Fig. 7.

Fig. 9 is a horizontal sectional view, as taken along the line 9—9 of Figs. 7 and 10.

Fig. 10 is a vertical sectional view of my improved bearing structure as applied to another form of spindle case, and, Fig. 11 is a horizontal sectional view, as taken along the line 11—11 of Fig. 10.

Great difficulty has been encountered heretofore in that all spindle bearings previously used have been open to the objection that when operating at high speeds the oil in the bearing would be drawn upwardly upon the rapidly rotating spindle blade and would accumulate above the upper end of the bolster and be thrown off from rapidly rotating parts of the spindle, thus resulting in a rapid withdrawal of oil from the bearing and in the still more objectionable scattering of oil over the adjacent parts of the machinery. As a result, it has been necessary to renew the oil in the bearings at relatively short intervals and the spraying of oil over adjacent parts of the floors and machine parts has been highly objectionable. Moreover, it frequently happens that a spindle will develop some slight bend or irregularity throughout its extent which if not overcome by providing means for centering the same in the bearing will produce irregularities in the spinning or twisting of the yarn. It has been found that these objectionable features are entirely eliminated or reduced to such an extent as to be practically negligible in the construction shown and described herein.

In order to more clearly set forth the novel features of my invention I have shown the same as applied to various types of spindle supports now in common use. Figs. 1 and 2 illustrate the same as applied to the conventional form of silk spindle, while the remaining figures show the same in connection with the more common forms of cotton, wool and worsted spindles now in use.

Referring to the Figs. 1 and 2 of the drawings, 1 represents the spindle standard or case such as is in common use in the spinning of silk, the case being provided with an externally threaded stem 2 adapted to be screwed into a rail (not shown) and a flange 3 adapted to rest upon the upper face of the rail. The case is provided with a longitudinal bore 4 extending throughout the major portion of the case and terminating a short distance from the lower end thereof to provide a bottom wall or base 5 for supporting the lower bolster member 6. The lower bolster member 6 is driven into the bore of the case into which it fits so closely as to prevent rotation of the bolster relative to the case. The lower bolster member 6 is provided with a central longitudinal bore 7 in the base of which is driven a hardened bearing 8 upon which the pointed end of the spindle blade 9 rests. A longitudinal groove 10 is formed in the outer face of the lower bolster member 6 and an opening 11 extends therefrom to the bearing 8 to conduct oil from the reservoir 12 to the bearing. An upper bolster member 14 is driven into the upper portion of the case and is spaced from the lower bolster member a sufficient distance to provide the oil reservoir 12 between said bolster members. The upper bolster is provided upon its outer face with a pair of longitudinal grooves 17 and 18 which extend throughout the length of the bolster. The upper bolster member 14 is further provided with a central bore 16 for the reception of the blade 9 of the spindle 20 which carries the usual whirl 21. An oil passage 22 is formed in the case 1 and extends from an oil cup 23 to the reservoir 12 whereby oil may be supplied to the reservoir as necessity arises.

In the above construction the upper and lower bolster members are held against rotation by being driven tightly into the case, and as the spindle rotates oil from the reservoir is drawn upwardly on the blade 9 between the blade and the inner wall of the upper bolster element by capillary action.

When the oil drawn upwardly between the rotating spindle blade and the bolster element reaches the upper end of the bolster 14, capillary action is no longer effective to cause the oil to travel upwardly on the spindle blade and it spreads over the top of the bolster from which point gravity would tend to return it to the oil reservoir.

If a single groove is provided between the outer face of the bolster and the case, this tendency is opposed by the air pressure in the reservoir, but the provision of two grooves 17 and 18 in the outer face of the bolster permits the relatively free return of the oil by providing a vent for the upward passage of air through one groove during the descent of oil through the other. The oil at the top of the bolster is thus returned to the reservoir as rapidly as it is drawn upwardly on the spindle blade and an accumulation of oil on the top of the bolster is prevented.

Referring to Figs. 3 to 11 of the drawings 25 designates spindle standards or cases such as are in common use in connection with the spinning of cotton, wool and worsted, and which may be said to be of similar construction, although differing from each other somewhat in detail. Each of these spindle cases 25 is provided with an exteriorly threaded stem 26 adapted to be screwed into a rail (not shown), and has a flange 27 adapted to rest upon the upper face of the rail. Each of said cases is provided with a longitudinal bore 28 extending throughout the major portion of its extent and terminating a short distance from the lower end of the case to provide a bottom wall 29 for supporting the lower bolster member.

Each of said cases is also provided with an oil cup 30, from which an oil passage 31 is formed leading to the longitudinal bore in the case.

Referring more particularly to the construction shown in Figs. 3, 4 and 5, the lower bolster member 33 is provided with a central longitudinal bore 34 for the reception of the spindle blade and a hardened base 35 is secured therein as a bearing for the tapered end of the spindle blade 36. The bolster 33 is provided upon its outer face with a groove 37 which extends upwardly from the base of the bolster throughout a portion of its extent and within which fits a pin 38 projecting inwardly from the case 25 to hold the lower bolster against rotation relative to the case. A second longitudinal groove 39 is formed on the outer face of the bolster 33 and may extend throughout its length for the reception of a spline 40, which when the parts are in assembled position, extends upwardly therefrom and fits in a groove formed in the outer face of the upper bolster member. The lower bolster member is made of sufficiently less diameter than the bore of the case to give the same a clearance sufficient to permit slight radial movement of the lower bolster 33 in the bore of the case.

An upper bolster member 41 fits within the upper portion of the case 25, and is so formed as to have relatively less clearance between its outer face and the inner wall of the case than is provided between the lower bolster and the inner wall of the case. The upper bolster is provided upon its outer face with a longitudinal groove 42 which extends upwardly from the lower edge thereof throughout a portion of its extent, and within which the upper end of the spline 40 fits, the upper end of the spline 40 bearing against the upper wall of the groove at 43 to prevent downward movement of the upper bolster below the position shown in Fig. 3 and thus maintain the upper and lower bolster members spaced from each other to provide an oil reservoir 44 therebetween. The lower bolster is kept from rotation relative to the case by the pin and groove connection 37, 38, and the upper bolster is held against rotation relative to the lower bolster by the spline 40. The upper bolster 41 is also provided upon its outer face with a pair of longitudinal grooves 45 and 46 which extend throughout the length of the bolster to permit the downward flow of oil from the top of the bolster and the release of air from the oil reservoir, and has a central bore 47 for the reception of the blade 36 of the spindle 48.

In the forms shown in Figs. 3 to 11 inclusive, similar spindles 48, each provided with a whirl 49 and a spindle blade 36, are supported by the cases, the blade in each instance being rotatably mounted in the upper and lower bolster elements.

In the forms shown in Figs. 7 and 8 of the drawings the lower bolster 50 is provided with a central bore 51 which extends throughout a portion of its length and has positioned therein a hardened base 52 serving as a bearing for the tapered end 39 of the spindle blade. The lower bolster 50 is provided upon its outer face with a groove 54 for the reception of the spline 40, and the lower bolsters as shown in the constructions illustrated in Figs. 7 to 11 are each provided with an opening 55 located adjacent to the hardened bearings for supplying oil to those bearings. The spline 40 extends upwardly and fits within a groove 42 formed in the outer face of the upper bolster member 57 supporting the upper bolster by contact with the upper wall of the groove at 43 in the same manner as shown in Figs. 3 and 6, thus spacing the bolsters from each other to provide an oil reservoir 44 therebetween.

The upper bolster member 57 is provided upon its outer face with a groove 42, which extends from the bottom of the bolster throughout a portion of its extent for the reception of the spline 40, as previously described, and a pair of longitudinal grooves 58, 59 extending entirely throughout its length to permit the flow of oil from the top of the bolster to the reservoir and the escape of oil from the reservoir. A groove 61 is formed in the outer face of the bolster 57 and extends from the bottom of the bolster throughout a portion of its extent within which fits a pin 62 carried by the case 25. This pin and groove connection between the upper bolster and the case prevents rotation of the upper bolster member relative to the case, while the lower bolster is held against rotation relative to the case and upper bolster member by the spline 40. The upper and lower bolster members are spaced apart to provide the oil reservoir therebetween by means of the spline 40, or if desired, by the pin 62 engaging the end of the groove 61.

In the form of the invention illustrated in Figs. 10 and 11, the lower bolster member 60 is provided with a central bore 72 extending throughout a portion of its length and having a hardened base 73 positioned therein to form a bearing for the tapered end 39 of the spindle blade. The lower bolster is provided upon its outer face with a groove 63 for the reception of the spline 40. The spline 40 extends upwardly and fits within a groove formed in the outer face of the upper bolster member 65. The upper bolster member 65 is provided with a shoulder 66 which engages a shoulder 67 formed in the case 25, and the groove 64 may extend above the shoulder, as shown in Fig. 10. A groove 68 is formed in the inner face of the case 25 and extends throughout a portion of its length, which groove receives a pin 69 carried by the bolster 65 to hold the upper bolster element against rotation in the case 25. A pair of longitudinal grooves 70, 71 are formed in the outer face of the upper bolster member and extend throughout its length to permit oil to flow freely from the top of the upper bolster member to the oil reservoir 44 located between the bolster members. In this form of the invention the upper bolster member may be maintained in position spaced from the lower bolster member by the shoulders 66, 67, by the pin 69 engaging the upper end of the groove 68, or by the spline 40 engaging the upper end of the groove 64.

The upper bolster member is held against rotation relative to the case by means of the pin 69 engaging the slot 68, and the lower bolster member is held against rotation relative to the case and upper bolster member by the spline 40.

The provision of a spindle bearing comprising upper and lower bolster members separated from each other to provide an oil well therebetween and the upper bolster member provided with a pair of longitudinal grooves upon its outer face to permit the return of oil from the upper end of the upper bolster member to the oil reservoir and escape of air from the reservoir has been found effective to prevent the bubbling of oil in the oil cup 30 and to prevent the discharge of oil from the top of the case, defects which it has never been possible to overcome with any of the previous forms of spindle bearings. The spline 40 serves to prevent relative rotation of the upper and lower bolster members, while one of said bolster members is retained against rotation relative to the case by the pin and groove connections shown. The provision of a relatively large clearance, such as fifteen to twenty-five thousandths of an inch, between the lower bolster and the inner wall of the bore of the case, and a relatively small clearance, such as two to three thousandths of an inch, between the upper bolster and the inner wall of the case affords a simple and highly efficient means for centering the spindles in the spinning or twisting due to slight bends in the spindles.

Experimental tests with the type of spindle bearings shown herein have demonstrated that the presence of two or more longitudinal grooves upon the outer face of the upper bolster member to permit free flow of oil from the top of the upper bolster member to the oil reservoir is of great importance in that such construction tends to prevent discharge of oil from the bolster case and thereby enables the bearings to run for a greater length of time without reoiling than has ever been possible heretofore with bearings for textile spindles. Moreover, such tests have shown that the provision of proper clearances between the spindle and the bolster members is desirable in order to obtain the best results in the operation of the bearings, and it appears that in the standard spindle casings having central bores of approximately five and one-half to six inches in length the proper clearance for best operating results is obtained when the internal diameter of the bolster members exceeds the diameter of the spindle by from .002 to .006 of an inch, although in casings of larger size greater clearances may be employed.

It is also found that the oil reservoir space between the upper and lower bolster members should not be unduly diminished, since if the oil reservoir space between the top of the lower bolster member and the bottom of the upper bolster member is reduced to less than one-fourth of an inch in casings having an internal bore of approximately five and one-half to six inches, such reduction of the length of the oil reservoir tends to cause discharge of oil from the casing.

This application is a continuation in part of my application Serial Number 12,421 filed February 28, 1925.

It is to be understood that the structures shown herewith are for the purpose of illustration only, and that various changes may be made in the proportions and arrangements of the parts as well as in the substitution of equivalents for various elements without departing from the spirit and intent of my invention, when broadly construed in the light of the appended claims, and, as an example of the changes which may be made in the structure shown without departing from the spirit and intent of the invention, I may, if desired, provide a number of longitudinal grooves in the outer face of the upper bolster member in excess of the two shown for permitting the flow of oil downwardly into the reservoir and the escape of air from the reservoir, and wherever the expression "pair of grooves" is used in the specification and claims as covering this feature it is to be understood that such language is equally applicable to a number of such grooves in excess of two.

It is also to be understood that the position of the pin and groove as carried by the case and bolster respectively, may be reversed, if desired, to provide a groove in the case and a pin carried by the bolster and fitting in the groove, to prevent relative rotation of the case and bolster.

What I claim is:

1. A spindle bearing comprising a spindle case having a longitudinal bore of substantially uniform cross section throughout its extent, of upper and lower bolster members slidably mounted within the case and each provided with a central bore for the reception of a spindle, and means within the case supporting said upper bolster member in spaced relation to said lower bolster member and at the same time retaining said bolster members against relative rotation.

2. A spindle bearing comprising a spindle case having a longitudinal bore of substantially uniform cross section throughout its extent, of upper and lower bolster members slidably mounted within the case and each provided with a central bore for the reception of a spindle, and means within the case supporting said upper bolster member in spaced relation to said lower bolster member and at the same time retaining said bolster members against relative rotation, said upper bolster member being provided upon its outer face with a pair of longitudinal grooves for permitting the free passage of oil from the top of said upper bolster member to the space between said bolster members.

3. In a spindle bearing, the combination with a spindle case having a longitudinal bore, of upper and lower bolster members disposed within the case, means in said case separate from said case and bolster members for supporting said upper bolster member in spaced relation to said lower bolster member to form an oil reservoir therebetween and prevent rotation of said bolster members relative to each other, and means interposed between one of said bolster members and said case to prevent rotation of the bolster member relative to said case.

4. A spindle bearing comprising a spindle case having a longitudinal bore, upper and lower bolster members disposed within said case, said upper bolster member being provided upon its outer face with two or more grooves extending throughout the length thereof, and means connecting said bolster members and supporting said upper bolster member to maintain them in spaced relation to each other and provide an oil reservoir therebetween.

5. In a spindle bearing, the combination with a spindle case having a longitudinal bore, of upper and lower bolster members disposed within the case, means in said case supporting said upper bolster member and maintaining said bolster members in spaced relation to each other to form an oil reservoir therebetween, the upper bolster member being provided with a pair of longitudinal grooves in the outer face thereof which extend throughout the entire length of said bolster member, said bolster member being formed to provide a relatively small clearance between the outer face of said bolster and the wall of the bore, the lower bolster member being formed to provide a relatively large clearance space between the outer face thereof and the inner wall of the bore whereby the lower bolster member may move radially of the bore and thus provide a self centering support for a spindle.

6. A spindle bearing comprising a spindle case having a longitudinal bore, upper and lower bolster members disposed within the case, and a spline connecting said bolster members and positively spacing them from each other to form an oil reservoir therebetween, said upper bolster member being provided with a pair of longitudinal grooves upon its outer face which extend throughout the entire length of the bolster member, said bolster member having only a slight clearance between the outer face thereof and the wall of the bore, the lower bolster member being of smaller diameter than the upper bolster member to provide a relatively large clearance between the outer face thereof and the wall of the bore.

7. A spindle bearing comprising a spindle case having a longitudinal bore, upper and lower bolster members disposed within the case, said upper bolster member being provided with a pair of longitudinal grooves upon the outer face thereof, a spline element engaging said bolster members to prevent their rotation relative to each other and maintain them in spaced relation to provide an oil reservoir therebetween, and a pin and slot connection between one of said bolster members and said case to prevent rotation of said member relative to the case.

8. In a spindle bearing, the combination with a spindle case having a longitudinal bore, of upper and lower bolster members disposed within the case, the upper bolster member being formed to provide a relatively small clearance between the outer face of said bolster and the wall of the bore, the lower bolster member being seated on the base of the bolster case and formed to provide a relatively large clearance space between the outer face thereof and the inner wall of the bore whereby the lower bolster member may move radially of the bore upon the base of the bolster case and thus provide a self centering support for a spindle, and a spline element connecting said bolster members to space them from each other and retain them against relative rotation while permitting slidable movement of said lower bolster member on the base of the bolster case.

9. In a spindle bearing, the combination with a spindle case having a longitudinal bore, of upper and lower bolster members disposed within the case and each provided upon its outer face with a longitudinal groove, the longitudinal groove in the outer face of said upper bolster member extending throughout only a portion of its length, and a spline positioned in the grooves in said members and supporting said upper bolster member to maintain said bolster members in spaced relation to each other and thus provide an oil reservoir therebetween.

10. In a spindle bearing, upper and lower bolster members adapted to fit within the bore of a spindle case, and a spline member having one end resting upon the base of the spindle case and supporting said upper bolster member and positively maintaining said bolster members in spaced relation to each other when positioned within the spindle case.

In testimony whereof I have affixed my signature.

JOHN B. NAINTEAU.